(12) United States Patent
Bujon (10) Patent No.: US 10,018,073 B2
(45) Date of Patent: Jul. 10, 2018

(54) METHOD FOR CONTROLLING A BISTABLE SHUTOFF VALVE FOR AN AIRCRAFT ENGINE

(71) Applicant: Safran Aircraft Engines, Paris (FR)

(72) Inventor: Irene Bujon, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 15/326,999

(22) PCT Filed: Jul. 16, 2015

(86) PCT No.: PCT/FR2015/051957
§ 371 (c)(1),
(2) Date: Jan. 17, 2017

(87) PCT Pub. No.: WO2016/009155
PCT Pub. Date: Jan. 21, 2016

(65) Prior Publication Data
US 2017/0218791 A1     Aug. 3, 2017

(30) Foreign Application Priority Data

Jul. 18, 2014   (FR) ...................................... 14 56953

(51) Int. Cl.
*F02C 9/26*     (2006.01)
*F01D 21/14*    (2006.01)
(Continued)

(52) U.S. Cl.
CPC .............. *F01D 21/14* (2013.01); *F01D 21/20* (2013.01); *F02C 9/26* (2013.01); *F02C 9/46* (2013.01); *F05D 2270/62* (2013.01)

(58) Field of Classification Search
CPC .......... F01D 21/00; F01D 21/14; F01D 21/20; F05D 2270/62; F02C 9/26; F02C 9/46
(Continued)

(56) References Cited

U.S. PATENT DOCUMENTS 4,878,464 A * 11/1989 Richeson, Jr. .......... F01L 9/026
123/90.11
4,883,025 A * 11/1989 Richeson, Jr. ............ F01L 1/16
123/90.11
(Continued)

FOREIGN PATENT DOCUMENTS

| EP | 0223684 A1 | 5/1987 |
| EP | 1350942 A2 | 10/2003 |
| WO | WO2014020262 A1 | 2/2014 |

OTHER PUBLICATIONS

International Search Report with English language translation, dated Oct. 27, 2015, International Application No. PCT/FR2015/051957 (14 pages).
(Continued)

*Primary Examiner* — Steven Sutherland
(74) *Attorney, Agent, or Firm* — Womble Bond Dickinson (US) LLP (57) ABSTRACT

There is proposed a method for controlling a bistable shutoff vale for an aircraft engine, involving the steps of: emitting a closure signal on one of the control channels—emitting an open signal on the other control channel, the method being characterized in that—the amplitude of the close signal is designed to cause the vane to move into a first position constantly in a given period of time,—in the same period, the amplitude of the open signal fluctuates between a value designed to urge the valve toward a second position and a rest value, the actuating values of the two signals being
(Continued)

adapted to one another in order to keep the vane immobile when the two signals received by the valve simultaneously adopt said actuation values.

11 Claims, 5 Drawing Sheets

(51) Int. Cl.
    *F01D 21/20*     (2006.01)
    *F02C 9/46*     (2006.01)

(58) Field of Classification Search
    USPC ................................................ 251/65, 129.2
    See application file for complete search history.

(56) References Cited

U.S. PATENT DOCUMENTS

| | | | |
|---|---|---|---|
| 6,598,621 B1 * | 7/2003 | Wygnanski | ........... F16K 31/003 137/624.18 |
| 7,252,114 B2 * | 8/2007 | Wygnanski | ......... F16K 31/0682 137/625.44 |

OTHER PUBLICATIONS

French Search Report with French language translation cover sheet, dated Apr. 13, 2015, French Application No. 1456953 (10 pages).

\* cited by examiner

METHOD FOR CONTROLLING A BISTABLE SHUTOFF VALVE FOR AN AIRCRAFT ENGINE

GENERAL FIELD

The invention relates to the field of actuators for aircraft engines.

It relates more particularly to a method and a device for controlling a shut-off valve for aircraft engine via several control channels.

PRIOR ART

An aircraft engine comprises actuators configurable in a first position and in a second position of two types: monostable actuators and bistable actuators.

A monostable actuator is configurable in its first position when it receives a control signal, and switches to its second position when this control signal ceases.

A bistable actuator is configurable in the first position by means of a first control signal, and in the second position by means of a second control signal. In the absence of one or the other of these two signals, the bistable action does not change position.

It is also known to control an aircraft engine actuator by means of several parallel control units, via independent control channels. In this way, if one of these units undergoes a breakdown, the actuator can still be controlled by another unit.

But if one of these control units undergoes a breakdown, an actuator of bistable type can be lead to receive the first signal and the second signal simultaneously via two different channels. These two contradicting signals prevent the actuator from functioning properly.

For some bistable actuators, especially those used in case of emergency to avoid catastrophic malfunction of the aircraft, such a malfunction in the presence of two contradicting signals is particularly harmful. In fact, positioning these actuators used in case of emergency in one of their two positions covers a priority character relative to positioning them in their other position, and simultaneous receipt of both contradicting signals endangers this prioritization.

By way of example, some malfunctions can cause an aircraft engine to deliver thrust greater than a maximum authorized threshold. Such malfunctions, known by the terminology TCM ("Thrust Control Malfunction"), render the aircraft uncontrollable on some flight phases and are therefore catastrophic. To avoid these malfunctions of type TCM, the engine of the aircraft is generally equipped with a shut-off valve provided to cut off the engine in an emergency, and is connected to several control channels.

It is therefore essential to prefer closing of this valve when this valve is in a situation where it receives an opening signal and a closing signal simultaneously.

Several solutions have been possible for avoiding blockage of such an actuator of an aircraft engine.

A first solution consists of implementing detection of TCM malfunction and control of the thrust on separate electronic cards, and a second solution consists of using an actuator specially dedicated to cutting off the engine in the event of a TCM malfunction.

However, since these two solutions need modifying of the architecture they require modifications or additional equipment dedicated to handling these TCM malfunctions. These two solutions are therefore particularly costly and complex to execute.

A third solution consists of using a monostable actuator with mechanical priority on closing: when a control signal were no longer to be sent to such a monostable valve, the latter would close and cut off the engine. But such a monostable actuator would tend to close on many simple malfunctions, which would considerably downgrade the robustness of the system to simple malfunctions with respect to engine cut-off, and the in-flight shutdown rate (IFSD).

A fourth solution consists of using a bistable actuator and supplying it with a pair of contradicting control signals of different intensities. The stronger intensity signal would be preferred in the event of simultaneous reception of two contradicting signals via several control channels. However, this fourth solution has the disadvantage of having to substantially modify the internal operation of the shut-off valve to respond properly to these control signals of different intensities.

PRESENTATION OF THE INVENTION

The aim of the invention therefore is to prevent blockage of a shut-off valve of an aircraft engine receiving contradicting controls, and eliminate the abovementioned disadvantages.

A method for controlling a bistable shut-off valve for an aircraft engine connected to two control channels is therefore proposed, the valve comprising a pallet movable between a first position in which the valve is closed and a second position in which the valve is open, the method comprises steps of:

emitting over one of the control channels a closing signal which stresses the pallet towards the first position, emitting over the other control channel an opening signal which stresses the pallet towards the second position, the method being characterized in that:

the amplitude of the closing signal is adjusted to an actuation value adapted to stress the pallet towards the first position constantly in a time interval of given time period, in the same time interval, the amplitude of the opening signal is adjusted to values oscillating between an actuation value adapted to stress the valve towards the second position and a rest value adapted to leave the movable element not stressed, the actuation values of the two signals being mutually adapted to apply to the pallet forces which cancel each other out and keep the pallet stationary, when the two signals received by the valve simultaneously take said actuation values in the given time interval.

When the two signals are received simultaneously by the valve during the above time interval, the pallet is stressed in two different ways at different instants.

At some instants of this time interval the two signals have amplitudes each positioned at an actuation value. The pallet of the valve then receives two contradicting orders: on the one hand, the order to switch to the first position (by the closing signal), and on the other hand the order to switch to the second position (by the opening signal); these two orders are not counteracted and the pallet does not change position.

At other instants of this time interval the opening signal takes the rest value. The pallet receives the order to switch to the first position (by the closing signal), but receives no other contradicting order. In these cases the pallet can switch to the first position only, unless it is already in this first position. However, the pallet cannot switch to the second position, no order going in this direction being received by the valve.

At the end of the abovementioned time period, the pallet can therefore be in its first position only (the valve is then closed) even if two closing and opening signals have been sent simultaneously to the bistable valve.

The method as proposed therefore makes a priority of the closing signal relative to the opening signal when these two signals are received simultaneously by the bistable valve.

A situation in which the engine cannot cut out when a malfunction of type TCM occurs as described in the introduction can therefore be avoided.

An advantage of the method as proposed is that it can be carried out on existing architecture via a number of minimal modifications at the emitting units of the control signals.

The method according to the invention is advantageously completed by the following features, taken singly or in any of their technically possible combinations.

The second signal can be a periodic signal.

This shape avoids having to perform particular synchronization between the opening signal and the closing signal to control the valve and make a priority of the positioning of the pallet in the first position.

The second signal can be a time-slot signal. A time-slot signal has the advantage of moving from one value to the other very rapidly and therefore switching the pallet rapidly, stably, and foreseeably.

The closing signal can further be a constant value, and the opening signal can be of amplitude equal to the value of the closing signal.

The opening signal can be kept alternating to the actuation and rest values during identical periods.

The control method can comprise generation, by a first coil, of a magnetic field from the closing signal to create displacement of the pallet towards the first position, and generation, by a second coil, of a magnetic field from the opening signal to create displacement of the pallet towards the second position, the actuation values of the two signals being mutually adapted so that the two magnetic fields apply to the pallet forces which cancel each other out so as to keep the pallet stationary.

Also, the opening signal can be kept at the rest value and/or at the actuation value during a time period greater than the sum of:
- a period for rise in current of the coil, and
- the time period taken by the pallet to switch from one of the first and second positions to an intermediate position comprised between the first and the second position, the intermediate position being such that the pallet can reach the other of the first and second positions from said intermediate position in the absence of stress of the pallet by the coils.

The second signal can further be produced by conversion of a signal of shape identical to the first signal. This performs the method proposed very simply on existing architecture operating with signals of identical shape.

According to a second aspect a device for controlling a bistable shut-off valve for an aircraft engine is also proposed, the valve comprising a pallet movable between a first position in which the valve is closed and a second position in which the valve is open, the device comprising:
two control channels connected to the valve,
at least one closing unit adapted to emit over one of the control channels a closing signal adapted to stress the pallet towards the first position,
at least one opening unit adapted to emit over the other control channel a closing signal adapted to stress the pallet towards the second position,
the control device being characterized in that:

the closing unit is configured to adjust the amplitude of the closing signal to an actuation value adapted to stress the pallet towards the first position constantly in a time interval of given time period,
the opening unit is configured, in the same time interval, to adjust the amplitude of the opening signal to values which oscillate between an actuation value adapted to stress the valve towards the second position and a rest value adapted to leave the movable element not stressed,
the actuation values of the two signals being mutually adapted to apply to the pallet forces which cancel each other out and keep the pallet stationary, when the two signals received by the valve take said actuation values simultaneously in the given time interval.

According to a third aspect, a shut-off system for an aircraft engine is also proposed comprising:
a shut-off valve of the engine, comprising a pallet movable between a first position in which the valve is closed and a second position in which the valve is open,
the device for controlling the shut-off valve according to the second aspect of the invention as mentioned above.

An aircraft engine comprising such a shut-off system is also proposed.

DESCRIPTION OF THE FIGURES

Other features, aims and advantages of the invention will emerge from the following description which is purely illustrative and non-limiting, and which must be considered with respect to the appended drawings, in which.

In all figures similar elements bear identical references.

DETAILED DESCRIPTION OF THE INVENTION

Figure 1:
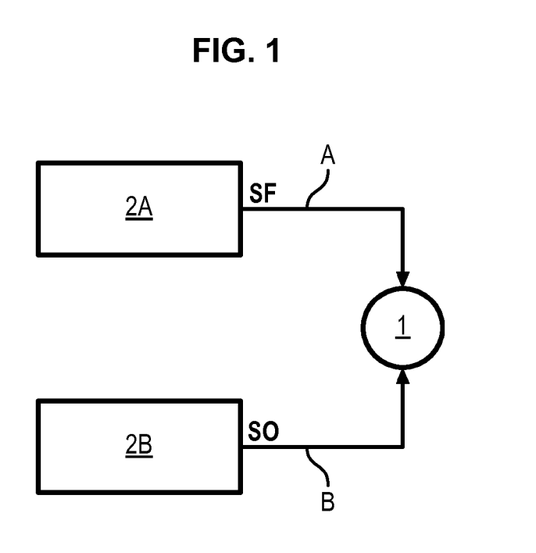
FIGS. 1 and 2 schematically illustrate a control system according to an embodiment of the invention.
Figure 2:
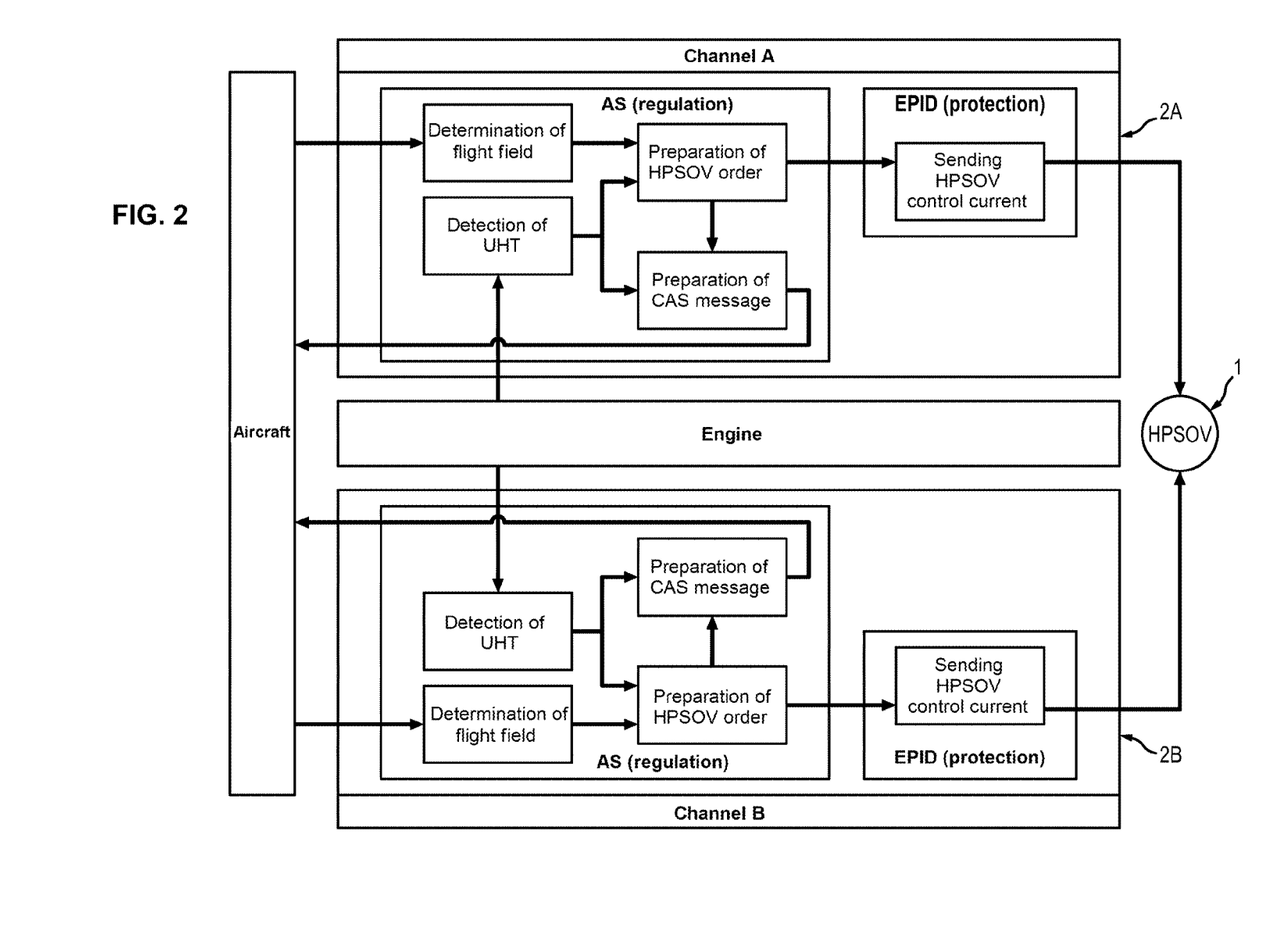

In reference to FIGS. 1 and 2, an aircraft engine comprises a shut-off valve 1 of the engine and a device for controlling this valve 1.

The function of the shut-off valve 1 is to shut-off the engine of the aircraft. This valve can typically be a high-pressure shut-off valve (HPSOV).

The control device comprises at least two control units 2A and 2B adapted to control the shut-off valve 1.

The control unit 2A is connected to the valve 1 by a channel A and the control unit 2B is connected to the same valve 1 by a channel B independent of the channel A.

Each of the control units 2A, 2B is adapted to emit over the corresponding control channel a closing signal of the valve or an opening signal of the valve.

Hereinbelow, it is supposed that each of these units 2A, 2B can emit these two types of control, but it can also be possible that the device has asymmetrical architecture in which one of the units is adapted to emit specifically controls for closing of the valve 1 and the other unit is adapted to emit specifically controls for opening of the valve 1.

The shut-off valve 1 is bistable. In the present text a bistable valve is defined by a valve capable of remaining in two stable states when not stressed by an external action: an open state and a closed state. In this case, the shut-off valve 1 cannot change state without receiving a control signal coming from channel A or channel B.

Figure 3:
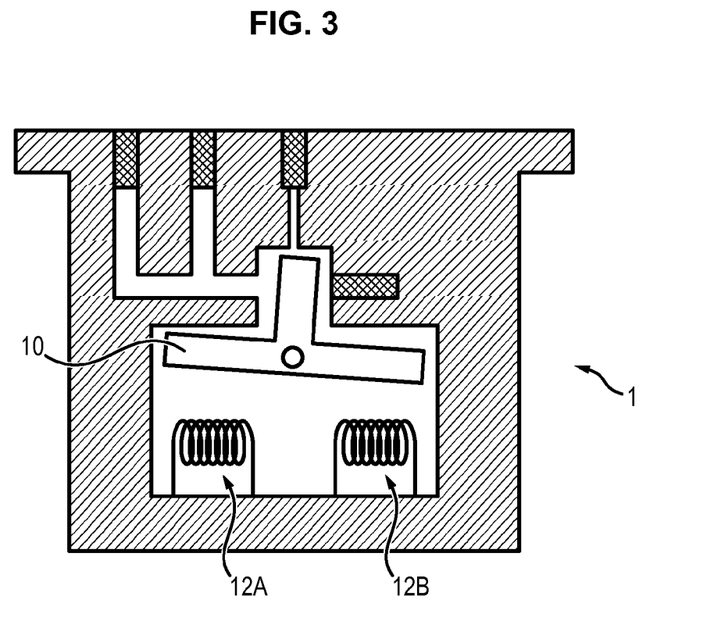
FIG. 3 illustrates a shut-off valve for aircraft engine according to an embodiment of the invention.

In an embodiment illustrated in FIG. 3, the valve 1 comprises a pallet 10. The pallet is an element movable between a closed position and an open position. When the pallet is in the closed position, the valve 1 is in the closed state and cuts off the engine of the aircraft if it is operating. However, the engine can function as long as the pallet is in the open position (the valve 1 is then in its open state).

The valve 1 also comprises a first coil 12A, and a second coil 12B.

Each coil 12A, 12B is adapted to stress displacement of the pallet when current of intensity different to a rest value IR (typically zero) passes through this coil.

More precisely, the pallet 10 has a T-shape movable in rotation. The upper branch of this T comprises two opposite ends, each end being arranged facing a respective coil.

The coil 12A is connected to the control channel A. The coil 12B is connected to the control channel B.

When current according to a first predetermined intensity coming from channel A passes through the coil 12A, this coil 12A emits a magnetic field which pushes back the end of the pallet 10 in front; when current according to a second intensity of sign opposite the first intensity passes through this coil 12A, this coil emits a magnetic field which attracts to it this same end of the pallet 10 in front.

When a current according to a third intensity coming from channel B passes through the coil 12B, this coil 12B emits a magnetic field which pushes back the end of the pallet 10 in front; when current according to a fourth intensity of sign opposite the third intensity passes through this coil 12A, this coil emits a magnetic field which attracts to it this same end of the pallet 10 in front.

The two coils 12A and 12B are identical. It is assumed that each coil, when an intensity of value IO is applied to it, so-called opening value, stresses the pallet towards the open position.

It is supposed also that each coil, when applied to an intensity of value IF, so-called closing value, stresses the pallet towards the closed position.

A pair of signals for controlling opening and closing of the valve 1 will now be described, according to an embodiment illustrated in FIG. 4.

The bistable valve 1 is controlled by two different signals: an opening signal SO and a closing signal SF.

To close the valve 1, any control unit (2A or 2B) emits over the corresponding channel a constant closing intensity signal equal to the value IF. The closing signal SF is kept at this value IF during a time period sufficient for the corresponding coil to stress the pallet 10 towards the closed position.

To open the valve 1, any control unit 2A or 2B emits an opening signal SO over the corresponding channel, this opening signal being a periodic signal whereof the intensity oscillates between the value IR and the value IO. When the opening signal SO assumes the value IR the coil which receives the opening signal does not stress the pallet 10. However, when the electric signal assumes the value IO, this same coil stresses the pallet 10 towards the opening position of the valve 1.

Figure 4:
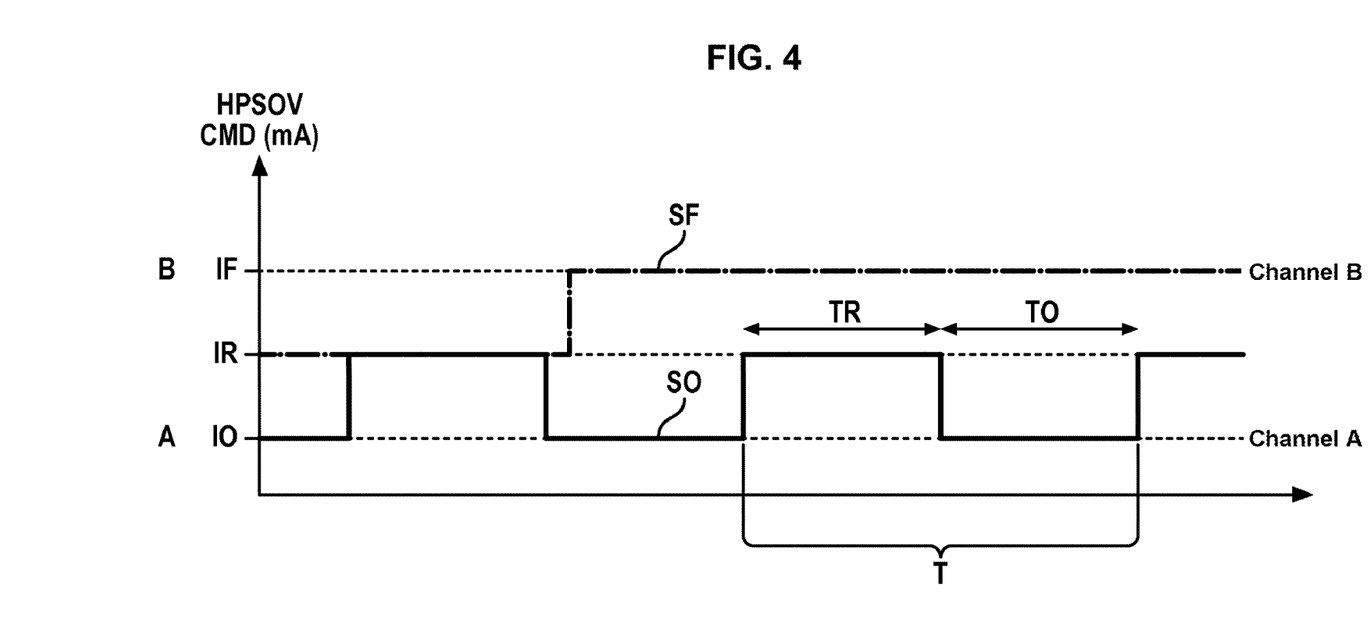
FIG. 4 illustrates a pair of control signals according to an embodiment of the invention, for controlling a shut-off valve for an aircraft engine.

In the embodiment illustrated in FIG. 4, the opening signal is a rectangular signal. A period T of this time-slot signal comprises two successive levels: a level at the value IR and a level at the value IO. In other words, the opening signal SO assumes the value IR during a time period TR and assumes the value IO during a time period TO, the period T being substantially equal to the sum TO+TR due to the time-slot shape of the opening signal SO (the opening time-slot signal moving almost instantaneously from the value IO to the value IR and vice-versa).

The time period TR is selected greater than the sum of
a period for rise in current of the coil, and
the time period taken by the pallet to switch from one of the first and second positions to an intermediate position between the first and the second position, the intermediate position being such that the pallet can reach the other of the first and second positions from said intermediate position in the absence of stress of the pallet by the coils.

The time periods TR and TO can be selected identical or different.

The values IF and IO can be selected equal, of opposite sign.

This uses identical coils 12A and 12B and symmetrical operation, which are current and simple to operate.

The opening signal SO stresses displacement of the pallet by means of one of the coils by intermittences only, while the closing signal constantly stresses during a time period at least equal to the period T of the opening signal SO illustrated in FIG. 4.

The presence of the two channels A and B for controlling the shut-off valve 1 makes three cases of operation possible.

In a first case of operation, one of the two units emits a control signal (SO or SF) over the corresponding channel while the other unit emits no signal over the corresponding channel.

In a second case of operation, the two units simultaneously emit a control signal of the same type (SO or SF).

These two cases of operation pose no problem, given that the valve 1 can switch to the state covered by the type of the control(s) emitted.

In a third case of operation, the two units simultaneously emit contradicting signals. The example taken here is where the unit 2A emits over the channel A the opening signal SO and the unit 2B simultaneously emits the closing signal SF over a period greater than the period T.

During the period T, the coil 12B is constantly stressed to switch the pallet 10 towards its closing position, while the coil 12A is stressed to switch the pallet towards the opening position of the valve only during the period T0 less than T.

More precisely, in the interval T0 the coil 12A stresses the pallet towards its opening position while the coil 12B contradictingly stresses the pallet 10 towards the closing position. The bistable character of the valve prevents the valve from changing state.

In the interval TR, the pallet 10 is stressed towards its closing position (by the closing signal SF positioned at the intensity IF), but is not stressed contradictorily toward its opening position (the opening signal SO being then positioned at the value IR). In this interval the pallet can switch to the closed position only, unless it is there already. However, the valve cannot switch to the open state, no order going in this direction being received by the coils 12A and 12B.

On completion of the period T, the pallet 10 is necessarily in the closed position. The pallet stays in this closed state provided the signal SF is retained or the signal SO stops being emitted.

The opening signal SO preferably starts at a level at the value IO so as to avoid delays in execution of the opening of the valve 1.

Figure 5:
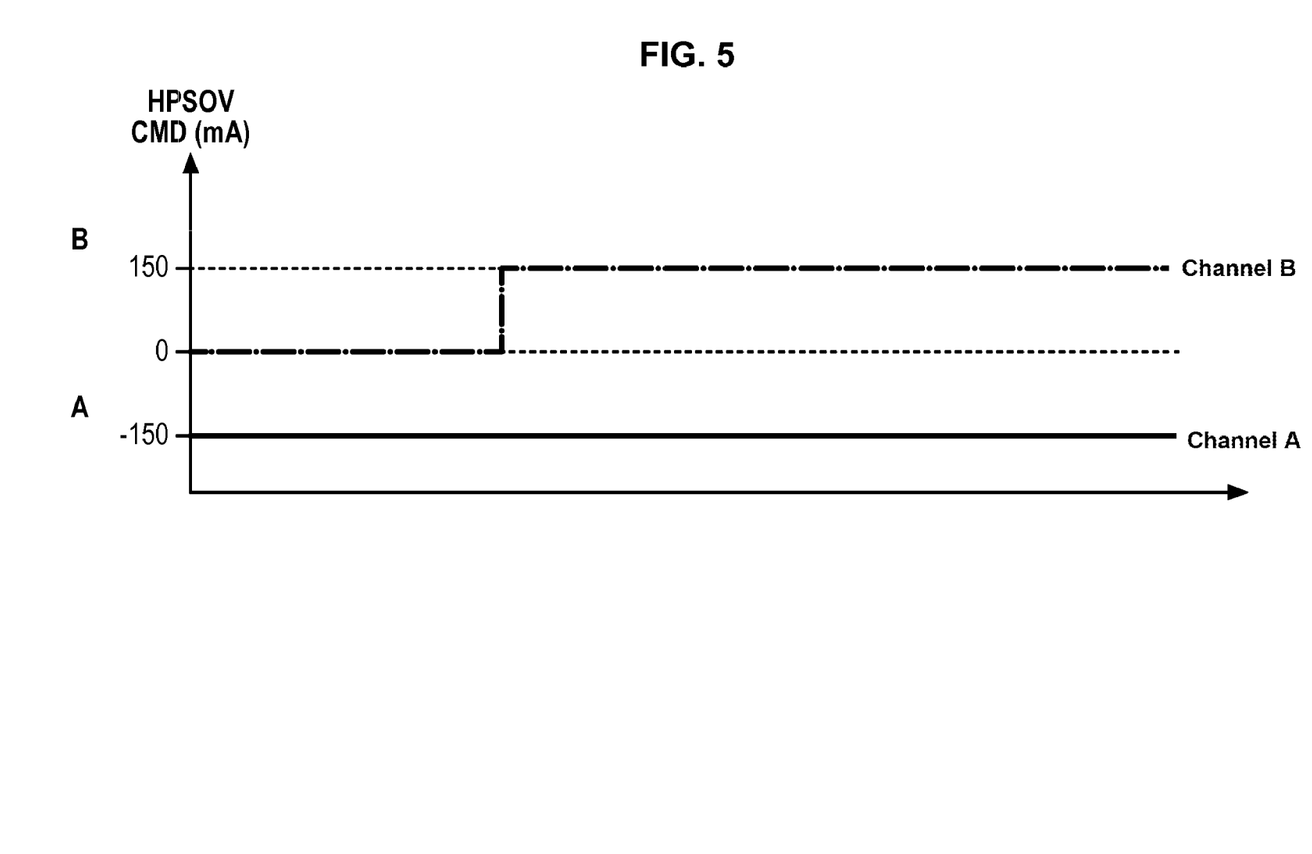
FIG. 5 illustrates a pair of control signals known for controlling a shut-off valve for an aircraft engine.

FIG. 5 represents a pair of classic opening and closing signals for controlling a bistable actuator. In contrast to the pair of signals presented in FIG. 4, these two known signals have identical shapes as both are kept at respective constant levels.

The method can comprise a conversion step of the known constant opening signal into the periodic opening signal (or even time-slot) ordering opening of the valve by intermittence, as per what has been presented earlier. Control units 2A and 2B arranged at output of primary control units adapted to generate this pair of constant signals can be provided, the units 2A and 2B limiting themselves to modify the shape of the constant opening signal emitted by the primary units into the intermittent opening signal as already discussed.

In an embodiment of the method, the following values are selected: IF=150 mA, IO=−150 mA, IR=0 mA, TR=TO=150 ms.

In fact there typically needs to be 25 ms at coils operating at +/−150 mA to achieve 90% of its rise in current, i.e., reach +/−135 mA. As soon as +/−135 mA is reached, the pallet 10 starts to move. In this example, the valve 1 has to be controlled for at least 100 ms so that the pallet has moved enough for the latter to continue moving all the same in the preferred position when control of the valve 1 ceases. So if the opening of the valve is controlled for only 125 ms, it will open. However, to have a little margin, it is preferable to select TO equal to 150 ms. Similarly, to close the valve 1, the current of the faulty channel will have to be forced to 0 mA for 150 ms.

The method according to the invention may be the subject of many variants.

In the embodiment presented above, the valve 1 is bistable. Also, the two coils react to intensities of identical absolute value and the opening and closing signals have values IO and IF equal in absolute value. Yet it is possible to provide two different coils 12A and 12B and/or signals SO and SF of respective different values IO and IF, of the moment when the opening signal and the closing signal are dimensioned relative to each other such that the valve does not change state when it receives these two signals simultaneously.

The coils 12A and 12B can be replaced by other means controlled in intensity or not (for example voltage), to move the pallet.

Also, the time periods TR and TO can be selected different, according to the operation of the actuator(s) selected for the valve 1.

The opening signal can have other periodic shapes, for example can be sinusoidal in shape.

The invention claimed is:

1. A method for controlling a bistable shut-off valve for an aircraft engine connected to two control channels, the bistable shut-off valve comprising a pallet movable between a first position in which the bistable shut-off valve is closed and a second position in which the bistable shut-off valve is open, wherein the method comprise:
   emitting over one of the control channels a closing signal which stresses the pallet towards the first position,
   emitting over the other control channel an opening signal which stresses the pallet towards the second position,
   wherein:
   an amplitude of the closing signal is adjusted to an actuation value adapted to stress the pallet towards the first position constantly in a time interval of given time period,
   in a same time interval, the amplitude of the opening signal is adjusted to values oscillating between an actuation value adapted to stress the pallet towards the second position and a rest value adapted to leave the pallet not stressed,
   wherein the actuation values of the two signals are mutually adapted to apply two pallet forces which cancel each other out and keep the pallet stationary, when the two signals received by the bistable shut-off valve simultaneously take said actuation values in the given time period.

2. The method according to claim 1, wherein the opening signal is periodic.

3. The method according to claim 1, wherein the opening signal is rectangular.

4. The method according to claim 1, wherein the actuation value of the opening signal is equal to the actuation value of the closing signal.

5. The method according to claim 1, wherein the bistable shut-off valve comprises generating, by a first coil, a magnetic field from the closing signal to create displacement of the pallet towards the first position, and generating, by a second coil, a magnetic field from the opening signal to create displacement of the pallet towards the second position, the actuation values of the two signals being mutually adapted so that the two magnetic fields apply two pallet forces which cancel each other out so as to keep the pallet stationary.

6. The method according to claim 1, wherein the opening signal is kept at the rest value and/or at the actuation value during a time period greater than the sum of:
   a period for rise in current of a coil, and
   the time period taken by the pallet to switch from one of the first and second positions to an intermediate position comprised between the first and the second position, the intermediate position being such that the pallet can reach the other of the first and second positions from said intermediate position in the absence of stress of the pallet by the actuation value.

7. The method according to claim 1, wherein the opening signal starts on a level of an actuation value adapted to stress the actuator towards the second position.

8. The method according to claim 1, the opening signal is produced by conversion of a signal of shape identical to the shape of the closing signal (SF).

9. A device for controlling a bistable shut-off valve for an aircraft engine, the bistable shut-off valve comprising a pallet movable between a first position in which the bistable shut-off valve is closed and a second position in which the bistable shut-off valve is open, the device comprising:
   two control channels connected to the bistable shut-off valve,
   at least one closing unit adapted to emit over one of the control channels a closing signal adapted to stress the pallet towards the first position,
   at least one opening unit adapted to emit over the other control channel an opening signal adapted to stress the pallet towards the second position,
   wherein:
   the closing unit is configured to adjust an amplitude of the closing signal to an actuation value adapted to stress the pallet towards the first position constantly in a time interval of given time period,
   the opening unit is configured, in the same time interval, to adjust an amplitude of the opening signal to values which oscillate between an actuation value adapted to stress the pallet towards the second position and a rest value adapted to leave the pallet not stressed, the actuation values of the opening and closing signals being mutually adapted to apply two pallet forces which cancel each other out and keep the pallet stationary, when the two signals received by the bistable shut-off valve take said actuation values simultaneously in the given time period.

10. A shut-off system for an aircraft engine comprising:
   a shut-off valve of the aircraft engine, comprising a pallet movable between a first position in which the shut-off valve is closed and a second position in which the shut-off valve is open,
   a device for controlling the shut-off valve according to the preceding claim.

11. An aircraft engine comprising a shut-off system according to claim 10.

* * * * *